(12) United States Patent
Barton

(10) Patent No.: US 12,279,659 B2
(45) Date of Patent: *Apr. 22, 2025

(54) REMOVABLE DRAPE FASHION SYSTEM

(71) Applicant: Kate Barton LLC, New York, NY (US)

(72) Inventor: Kate Barton, New York, NY (US)

(73) Assignee: Kate Barton LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,740

(22) Filed: Nov. 6, 2024

(65) Prior Publication Data

US 2025/0057261 A1   Feb. 20, 2025

Related U.S. Application Data

(63) Continuation of application No. 17/821,423, filed on Aug. 22, 2022, now Pat. No. 12,171,281.

(Continued)

(51) Int. Cl.
*A41D 1/00*   (2018.01)
*A41D 1/22*   (2018.01)
(Continued)

(52) U.S. Cl.
CPC .............. *A41D 1/00* (2013.01); *A41D 27/08* (2013.01); *A44B 18/0073* (2013.01); *B29C 51/002* (2013.01); *B29C 51/004* (2013.01); *B29C 51/14* (2013.01); *B29C 51/145* (2013.01); *B29C 51/32* (2013.01); *B32B 1/00* (2013.01); *B32B 3/28* (2013.01); *B32B 5/02* (2013.01); *B32B 27/02* (2013.01); *B32B 27/06* (2013.01); *B32B 27/12* (2013.01); *B32B 38/12* (2013.01); *A41D 1/22* (2013.01); *A41D 3/00* (2013.01); *A41D 15/00* (2013.01); *A41D 2200/00* (2013.01); *A41D 2300/00* (2013.01); *A41D 2500/00* (2013.01); *A41D 2500/52* (2013.01); *B29D 99/0064* (2013.01); *B29L 2031/48* (2013.01);

(Continued)

(58) Field of Classification Search
None
See application file for complete search history.

(56) References Cited

U.S. PATENT DOCUMENTS 229,309 A * 6/1880 Emmerich .............. E04C 2/043
428/130
4,007,835 A * 2/1977 Klothe ................. A41D 27/245
428/102

(Continued)

FOREIGN PATENT DOCUMENTS

| CN | 101912164 A | * 12/2010 | |
|---|---|---|---|
| FR | 2337980 A | * 9/1977 | ........... A41D 15/007 |
| JP | 2012041648 A | * 3/2012 | |

*Primary Examiner* — Jeffrey A Vonch
(74) *Attorney, Agent, or Firm* — Erise IP, P.A.

(57) ABSTRACT

A fashion system including a shaped garment comprising a base material and a removable drape is provided herein. The removable drape may be attached to the base material such that corresponding shapes of the base material and the removable drape cooperate to hold the removable drape in place. The base material may be formed using a geometric cutting technique and the removable drape may be formed using a thermoforming technique to create a complementary drape system.

20 Claims, 9 Drawing Sheets

Related U.S. Application Data

(60) Provisional application No. 63/236,059, filed on Aug. 23, 2021.

(51) Int. Cl.

| | | |
|---|---|---|
| A41D 27/08 | (2006.01) |
| A44B 18/00 | (2006.01) |
| B29C 51/00 | (2006.01) |
| B29C 51/14 | (2006.01) |
| B29C 51/32 | (2006.01) |
| B32B 1/00 | (2024.01) |
| B32B 3/28 | (2006.01) |
| B32B 5/02 | (2006.01) |
| B32B 27/02 | (2006.01) |
| B32B 27/06 | (2006.01) |
| B32B 27/12 | (2006.01) |
| B32B 38/12 | (2006.01) |
| A41D 3/00 | (2006.01) |
| A41D 15/00 | (2006.01) |
| B29D 99/00 | (2010.01) |
| B29L 31/48 | (2006.01) |
| B32B 7/12 | (2006.01) |

(52) U.S. Cl.
CPC ......... *B29L 2031/4842* (2013.01); *B32B 7/12* (2013.01); *B32B 2437/00* (2013.01); *Y10T 428/24025* (2015.01); *Y10T 428/24182* (2015.01); *Y10T 428/24273* (2015.01); *Y10T 428/24736* (2015.01)

(56) References Cited

U.S. PATENT DOCUMENTS

| | | | | |
|---|---|---|---|---|
| 4,645,629 A | * | 2/1987 | Stern | B29C 66/43 264/479 |
| 5,894,600 A | * | 4/1999 | Chenefront | A41D 15/00 2/243.1 |
| 2003/0104737 A1 | * | 6/2003 | Green | B44D 3/06 442/205 |
| 2019/0098950 A1 | * | 4/2019 | Chambe | A41F 1/00 |

\* cited by examiner

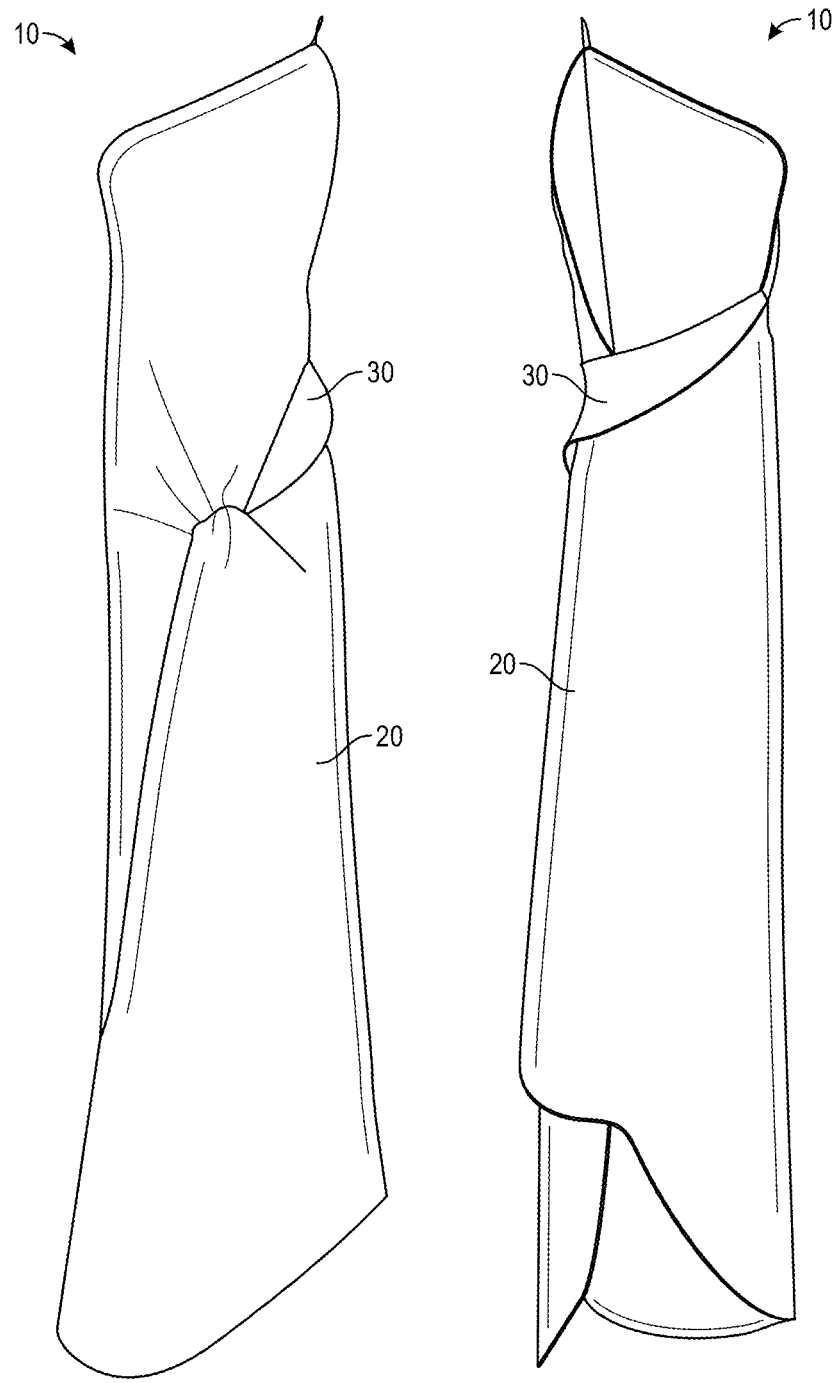
FIG. 1A      FIG. 1B

REMOVABLE DRAPE FASHION SYSTEM

RELATED APPLICATIONS

This patent application is a continuation application claiming priority benefit, with regard to all common subject matter, of U.S. patent application Ser. No. 17/821,423, filed Aug. 22, 2022, and entitled "REMOVABLE DRAPE FASHION SYSTEM," ("the '423 Application"). The '423 Application is a non-provisional patent application claiming prior benefit, with regard to all common subject matter, of earlier-filed U.S. Provisional Patent Application No. 63/236,059, filed Aug. 23, 2021, and entitled "REMOVABLE DRAPE FASHION SYSTEM." The above referenced patent applications are hereby incorporated by reference in their entirety into the present application.

BACKGROUND

1. Field

Embodiments of the present disclosure relate to garment shaping systems and, more specifically, to shaping garments by means of thermoforming and/or bonding.

2. Related Art

Garments and clothing in general will conform to the body shape of the individual wearing said clothing. To enhance the visual appeal of garments, structural components and weaving patterns may be used to fixate a three-dimensional structure in the garment. However, said methods require permanent fixation of the garment to the three-dimensional structure. Therefore, there is a need for a process of shaping garments in a three-dimensional structure without permanently fixating the garment in said shape. This would allow versatility and customization of the garment for the individual.

SUMMARY

In some aspects, the techniques described herein relate to a fashion system including: a first material having a draped configuration formed by a geometric cutting process, wherein the draped configuration includes a first shape; and at least one removable drape formed by a molding process, wherein the at least one removable drape includes a second material, wherein the at least one removable drape includes a second shape, and wherein the first shape and the second shape are complementary and have a corresponding fit that holds the at least one removable drape in place on the draped configuration.

In some aspects, the techniques described herein relate to a fashion system, wherein the geometric cutting process includes: forming a plurality of cut-outs in the first material, each of the plurality of cut-outs including a first edge and a second edge; and attaching the first edge to the second edge to form a fold, the fold forming a portion of the draped configuration.

In some aspects, the techniques described herein relate to a fashion system, wherein the geometric cutting process allows the draped configuration to be created without any seams or darts.

In some aspects, the techniques described herein relate to a fashion system, wherein the molding process includes: heating a flat sheet, the flat sheet including the second material; and molding the flat sheet into a three-dimensional shape, wherein the three-dimensional shape forms the at least one removable drape.

In some aspects, the techniques described herein relate to a fashion system, wherein the fashion system further includes a connector for coupling the at least one removable drape to the first material.

In some aspects, the techniques described herein relate to a fashion system, wherein the fashion system further includes at least one of: adhesives, snaps, hook-and-loop fasteners, or hooks for coupling the at least one removable drape to the first material.

In some aspects, the techniques described herein relate to a fashion system, wherein the at least one removable drape includes at least a first removable drape and a second removable drape, wherein the first removable drape has a different aesthetic feature than the second removable drape.

In some aspects, the techniques described herein relate to a fashion system, wherein the first material includes neoprene.

In some aspects, the techniques described herein relate to a fashion system, wherein the second material includes acrylic.

In some aspects, the techniques described herein relate to a process of manufacturing a shaped garment, including: providing a base material and a flat sheet of a drape material; forming a plurality of cut-outs in the base material, each cut-out of the plurality of cut-outs having a first edge and a second edge; attaching the first edge to the second edge to form a fold, wherein the fold forms a portion of a draped configuration; heating and forming the flat sheet into a three-dimensional shape, wherein the three-dimensional shape forms a removable drape; and attaching the removable drape to the draped configuration of the base material, wherein the removable drape and the draped configuration have complementary shapes that holds the removable drape on the base material.

In some aspects, the techniques described herein relate to a process, wherein attaching the removable drape includes: attaching the removable drape to the draped configuration using at least one of an adhesive, snaps, hook-and-loop fasteners, or hooks.

In some aspects, the techniques described herein relate to a process, wherein attaching the first edge to the second edge includes sewing the first edge to the second edge.

In some aspects, the techniques described herein relate to a process, wherein the drape material includes acrylic, and wherein the base material includes neoprene.

In some aspects, the techniques described herein relate to a process, wherein the removable drape is thermoformed such that the removable drape is configured to be reheated and reformed into a new three-dimensional shape.

In some aspects, the techniques described herein relate to a fashion system formed by a method including: forming a plurality of cut-outs in a base material, each of the plurality of cut-outs having a first edge and a second edge; coupling the first edge to the second edge to form a fold, wherein the fold forms a portion of a draped configuration, wherein the draped configuration includes a first shape; forming a draping layer into a three-dimensional shape to form a removable drape, wherein the removable drape includes a second shape; and coupling the removable drape to the draped configuration, wherein the first shape and the second shape are complementary such that the draped configuration receives the removable drape and couples thereto without a mechanical bond.

In some aspects, the techniques described herein relate to a fashion system, wherein the draping layer is thermoformed into the removable drape to form a strap for the fashion system.

In some aspects, the techniques described herein relate to a fashion system, wherein the method further includes: forming the removable drape from the three-dimensional shape into a new three-dimensional shape to form a new removable drape.

In some aspects, the techniques described herein relate to a fashion system, wherein the draping layer includes leather.

In some aspects, the techniques described herein relate to a fashion system, wherein the draping layer includes a first layer and a second layer, wherein the first layer includes a thermoplastic material and the second layer includes a leather, and wherein the second layer is draped over the first layer.

In some aspects, the techniques described herein relate to a fashion system, wherein the first layer is thermoformed into the three-dimensional shape.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 1A is a front view of a shaped garment in accordance with a first embodiment of the present disclosure;

FIG. 1B is a back view of the first embodiment of the shaped garment;

Figure 2A:
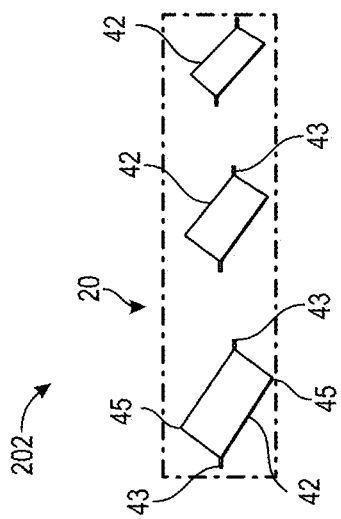
Figure 2B:
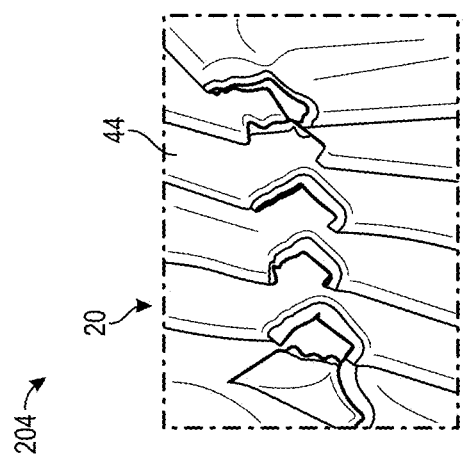
Figure 2C:
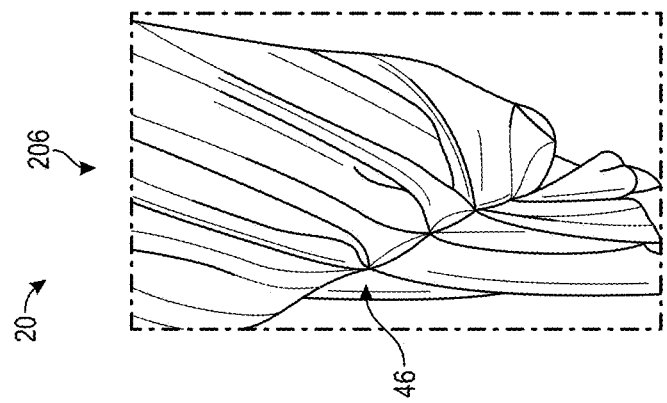
Figure 3A:
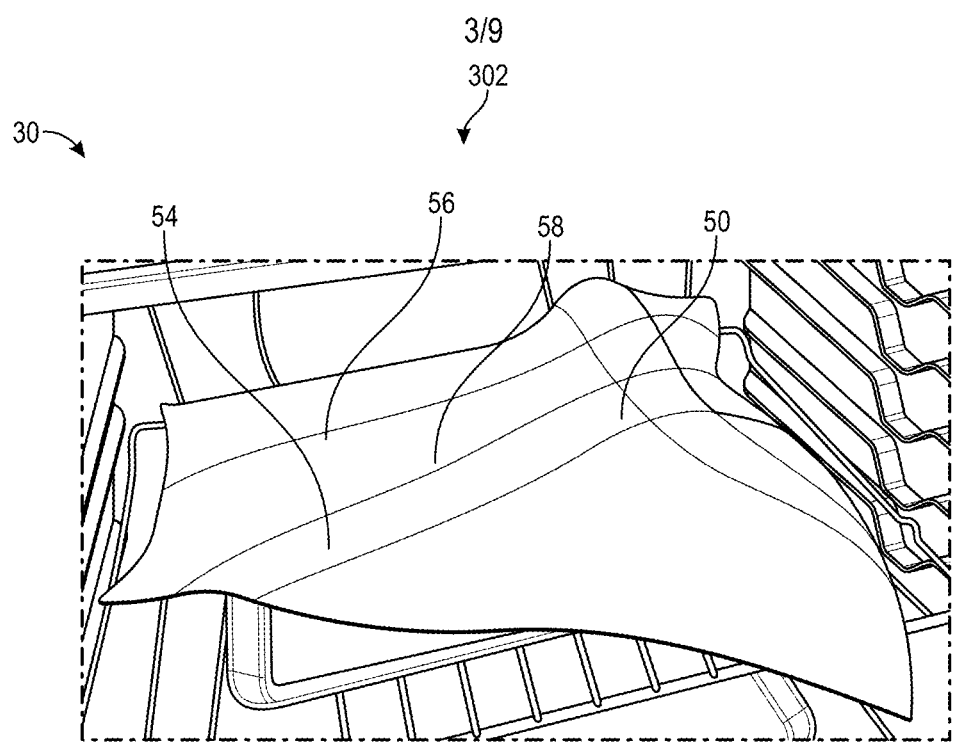
Figure 3B:
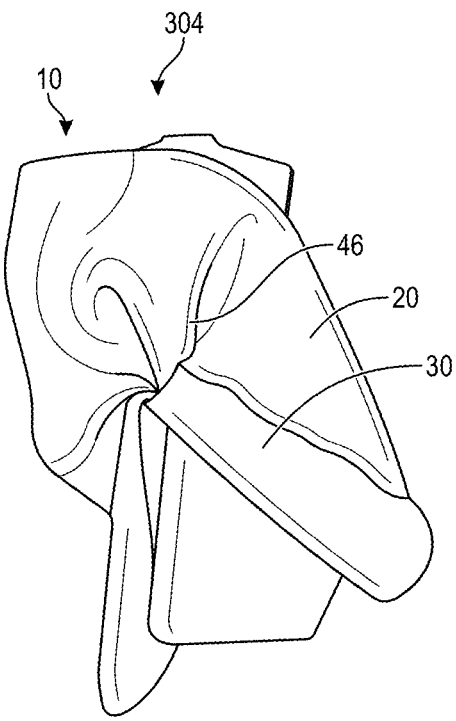
Figure 4:
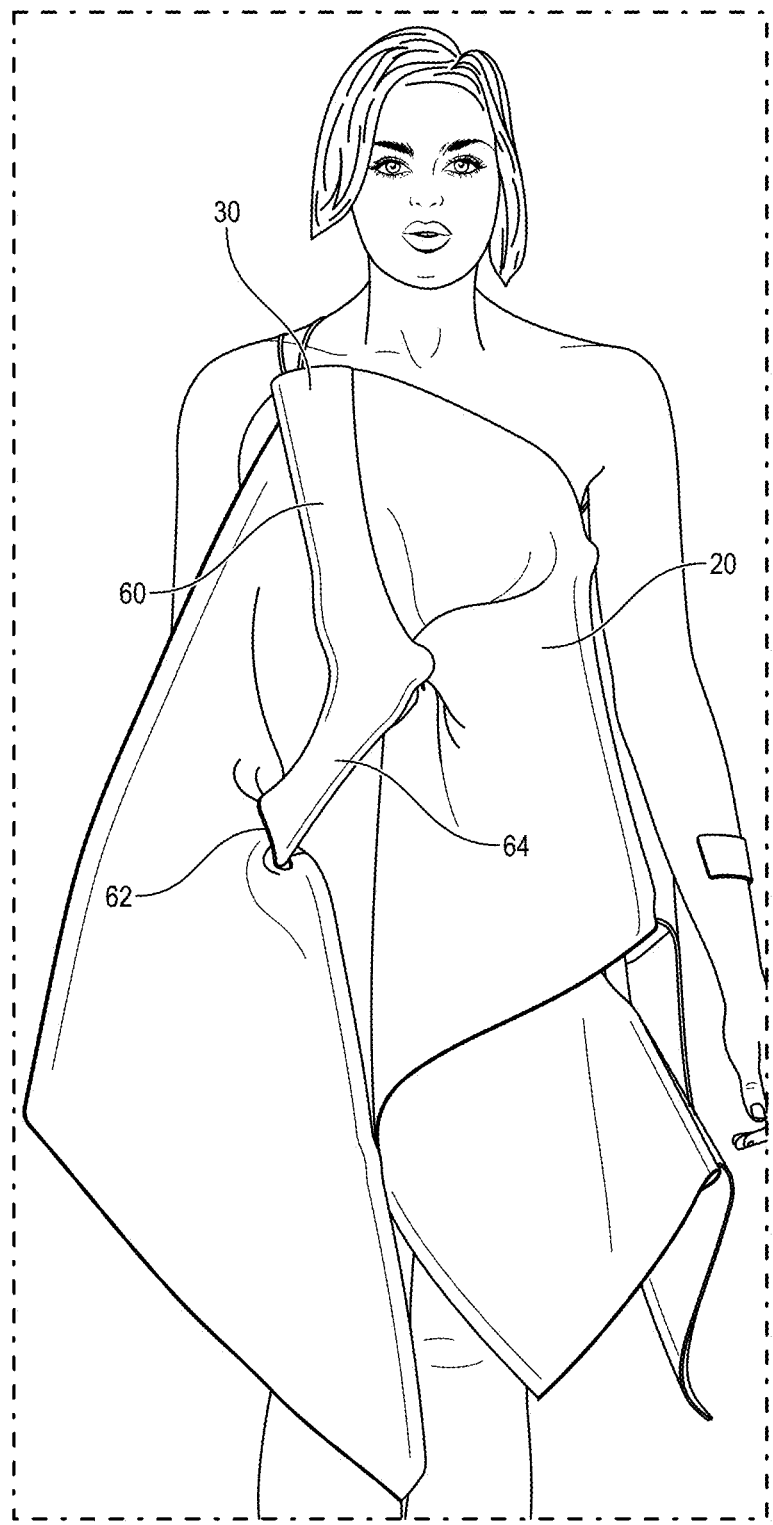
Figure 5:
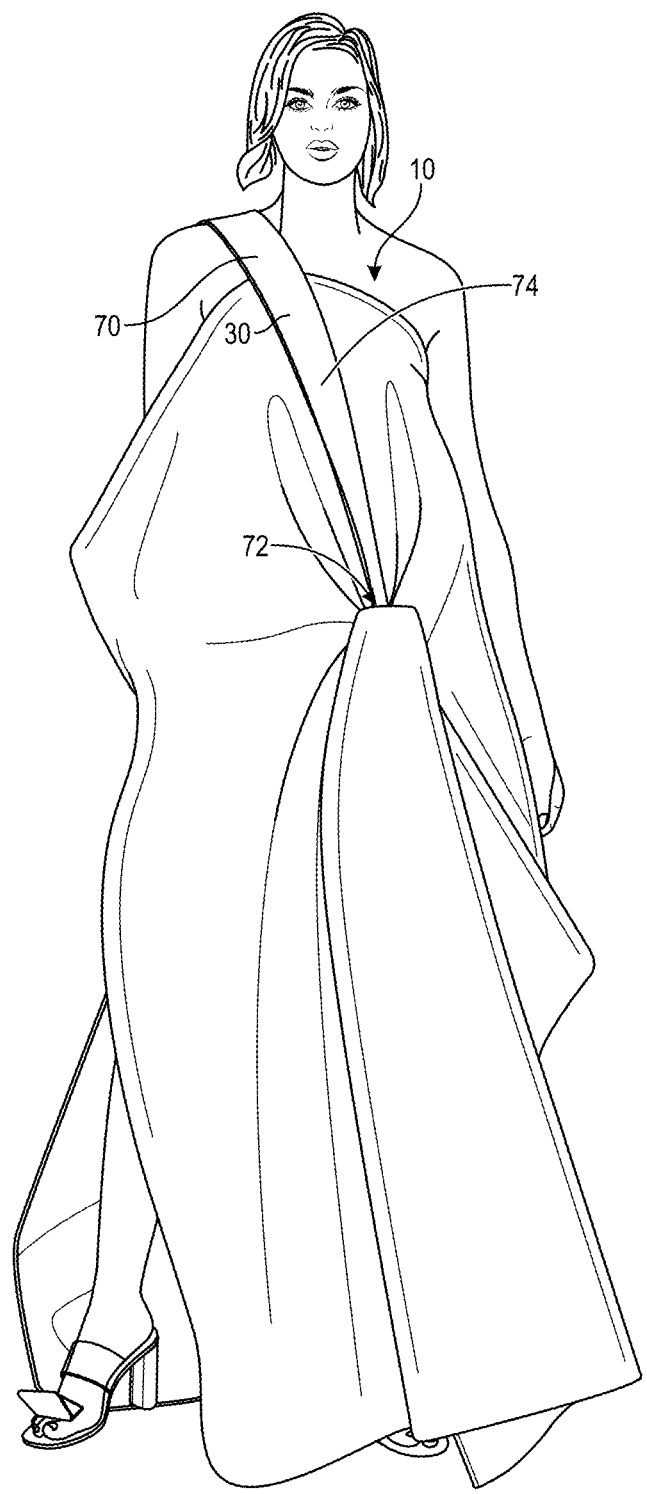
Figure 6:
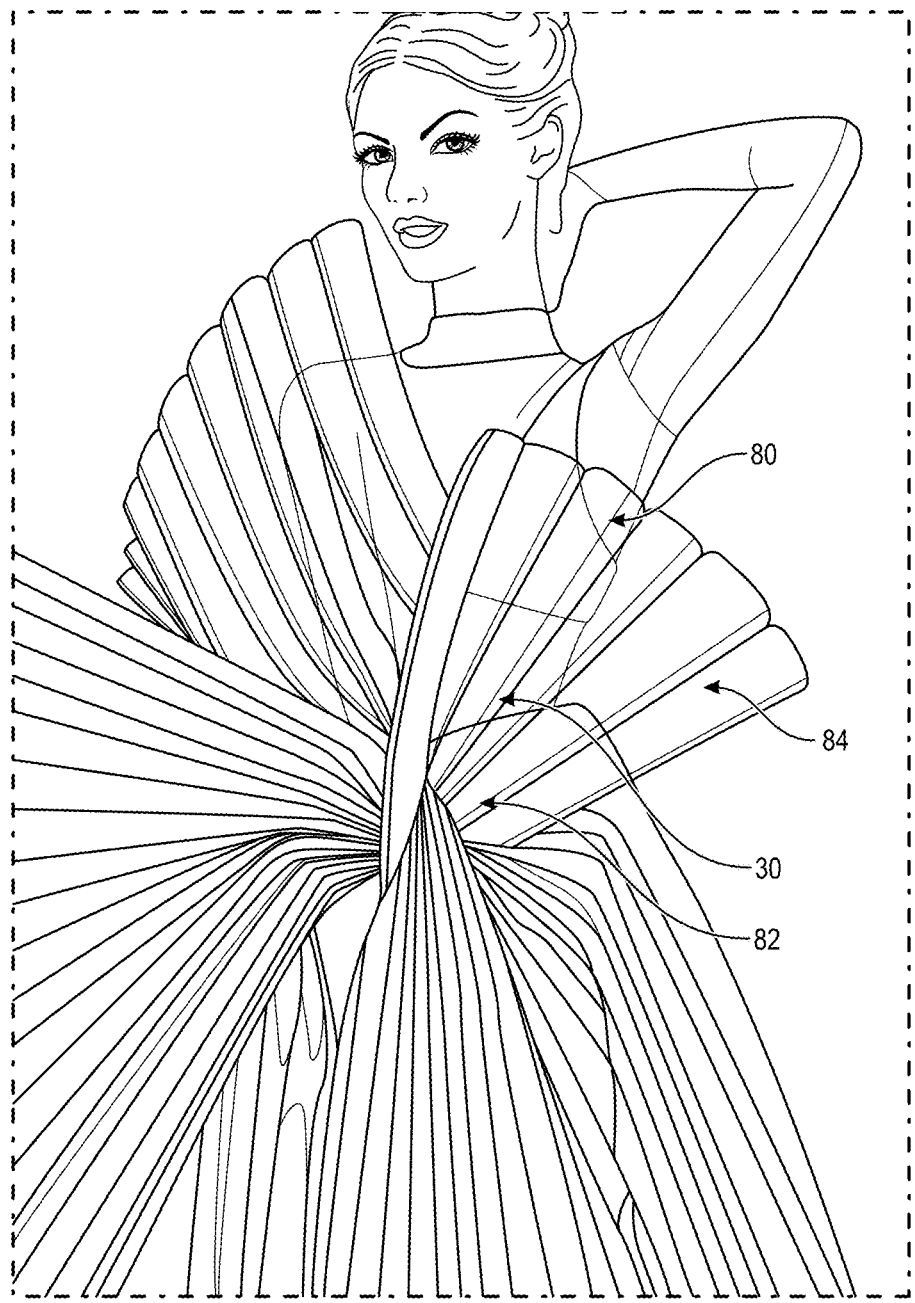
Figure 7A:
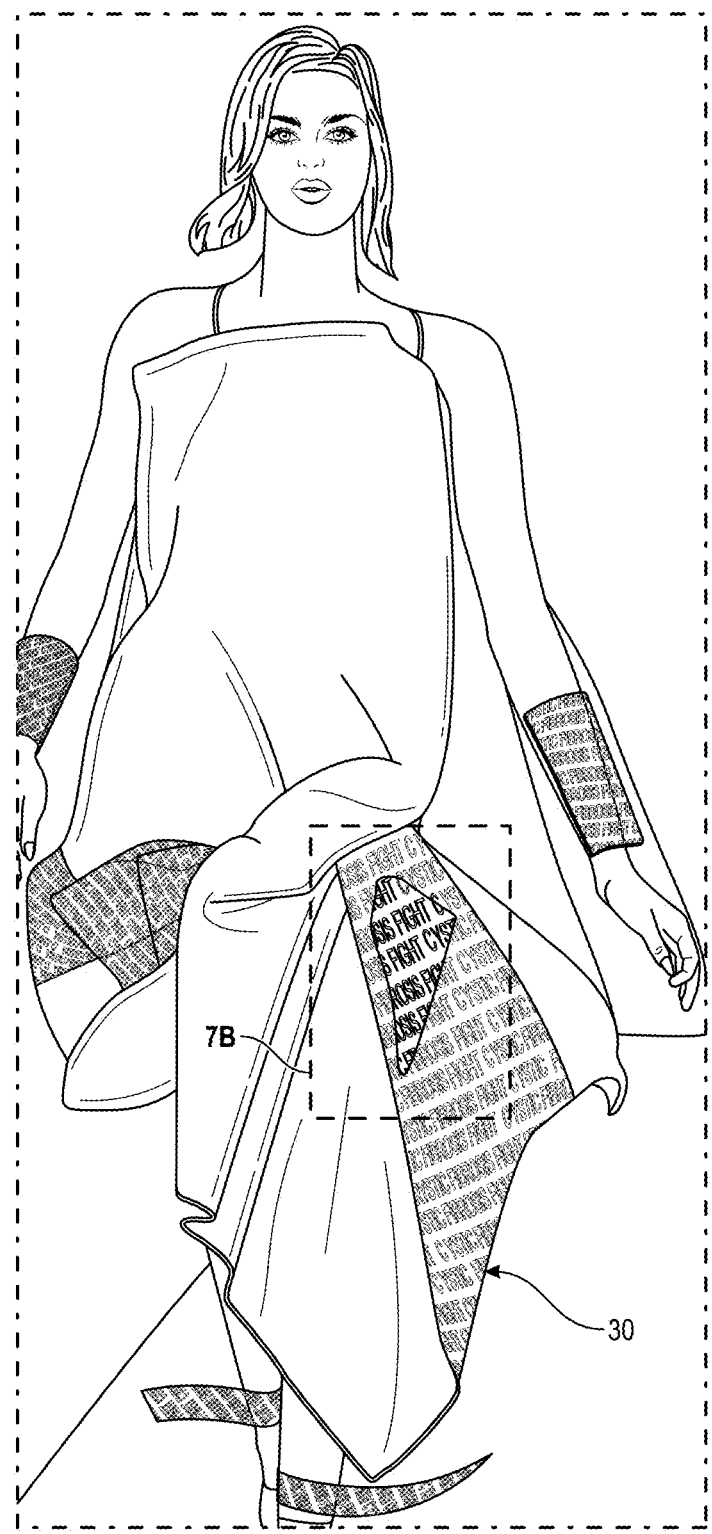
Figure 7B:
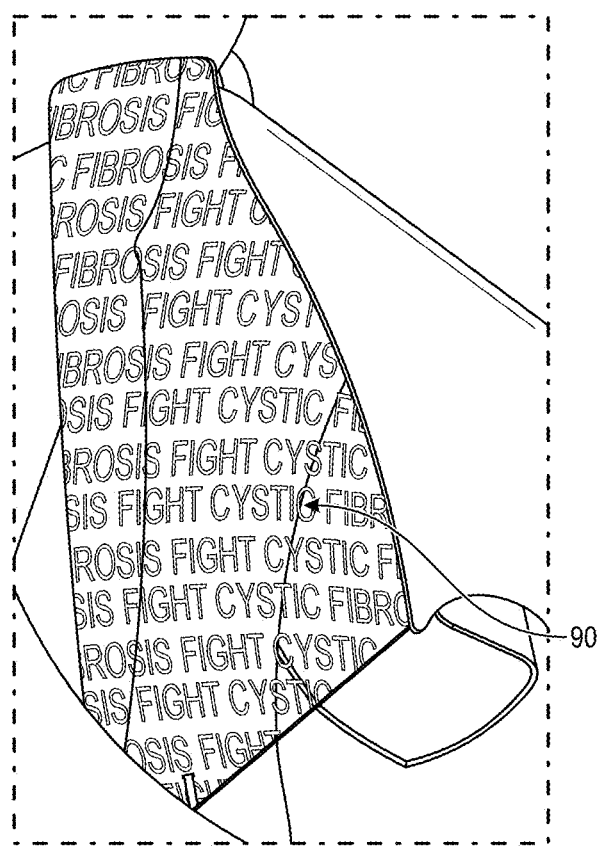
Figure 8:
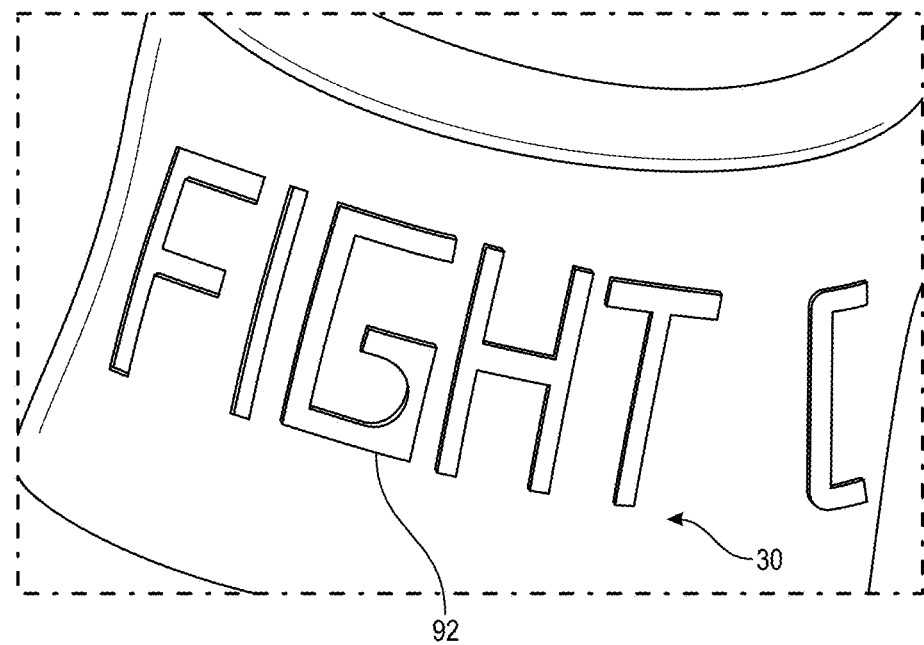
Figure 9:

FIGS. 2A, 2B, and 2C depict an exemplary geometric cutting process;

FIGS. 3A and 3B depict an exemplary molding process;

FIG. 4 illustrates a second embodiment of the shaped garment comprising an accent piece;

FIG. 5 illustrates a third embodiment of the shaped garment comprising a strap;

FIG. 6 illustrates a fourth embodiment of the shaped garment comprising a pleated attachment;

FIGS. 7A and 7B illustrate a screen-printed portion that may be included in a fifth embodiment of the shaped garment;

FIG. 8 illustrates an engraved portion that may be included in a sixth embodiment of the shaped garment; and FIG. 9 illustrates an encased object that may be included in a seventh embodiment of the shaped garment.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of the equivalents to which such claims are entitled.

In this description, references to "some embodiments," "an embodiment," or "embodiments" mean that the feature or features being referred to are included in at least some embodiments of the technology. Separate references to "some embodiments," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in some embodiments may also be included in other embodiments, but is not necessarily included. Thus, the technology can include a variety of combinations and/or integrations of the embodiments described herein.

The three-dimensional structure of a garment may not present a form other than that of the body of the individual wearing the garment unless otherwise altered using permanent structural alterations. Generally, these alterations may entail sewing the material together in a manner which may alter the three-dimensional structure of the garment into one that may present a form other than that of the body of the individual wearing the garment. Another alteration may entail weaving a structural component into the fabric of the garment, which may alter the three-dimensional structure of the garment into one that may present a form other than that of the body of the individual wearing the garment. Both alterations described above require fastening the fabric of the garment in a fixed configuration which may not be altered without compromising the fabric of the garment.

To address these shortcomings, a new process and methods of manufacturing and shaping garments into three-dimensional structures is described. Although the system is discussed with respect to gowns, the system can also be applied to other types of shaped garments, such as a dress, blouse, shirt, tank top, sweater, camisole, sweatshirt, hoodie, pullover, polo shirt, brassiere or bra, pants, jeans, capris, shorts, slacks, formal wear, military wear, dance wear, lingerie, panties, boxers, briefs, corsets, costumes, and many others.

FIGS. 1A and 1B show a first embodiment of a shaped garment 10 in the form of an evening gown. As can be seen in FIG. 1A and FIG. 1B, the shaped garment 10 may comprise a first or base material 20 and a removable drape 30. In some embodiments, the base material 20 may comprise any combination of suitable fabrics for use in clothing. For example, the base material 20 may comprise one or more of natural fibers, fibers from animal sources, synthetic fibers, or semi-synthetic fibers. Some examples of natural fibers include cotton, flax, hemp, sisal, jute, kenaf, and coconut. Some examples of fibers from animal sources include silk, wool, cashmere, and mohair. Some examples of synthetic fibers include polyester, nylon, spandex, or elastane, and other polymers. Some examples of semisynthetic fibers include rayon, viscose, modal, and lyocell. In some embodiments, at least a portion of the base material 20 may comprise neoprene. In some embodiments, the base material 20 is less rigid or stiff than the material(s) forming the removable drape 30. As discussed below, despite the differences in rigidity, base material 20 and removable drape 30 may be manipulated into corresponding shapes that allow removable drape 30 to be held in place on base material 20.

The removable drape 30 may comprise a second material which may be molded or formed into a specific desired shape and configured to maintain that shape. For example, the removable drape 30 may comprise an acrylic material or a leather. In some embodiments, the removable drape 30 may comprise an acrylic resin or another thermoplastic. In some embodiments, the removable drape 30 comprises a synthetic resin, such as those commonly used to form box toes. Broadly, removable drape 30 may comprise at least one material that can be thermoformed. In some embodiments, the removable drape 30 may comprise multiple layers. In some embodiments, the removable drape 30 comprises multiple layers having at least one layer that is not molded or formed into a desired shape. For example, the removable drape 30 may comprise a first material, such as a resin (e.g., a box toe material), that is thermoformed and a second material, such as leather, draped over the first material. In some embodiments, the box toe material comprises an adhesive that may be used to couple the box toe material to a second fabric, such as a leather. Thus, the second material or layer of the removable drape 30 may conform to the shape of the molded, first material.

In some embodiments, the material of removable drape 30 is formed from a thermoformable heel counter (e.g., leather and a built-in adhesive, or a cotton-based heel counter) that is heat activated at about 194° F. for a duration of about 40 seconds. One of skill in the art will appreciate that various temperatures and heat durations may be employed for various materials and desired shapes of removable drape 30 without departing from the scope hereof. As another example, a thermoplastic box toe material may also be fused to a second material (e.g., leather, acrylic, etc.) prior to thermoforming. Box toe materials are often formed from sustainable materials, thereby leading to less waste when forming garments. As still another example, liquid organza and a RPET (recycled polyethylene terephthalate) spacer may be used as the material for removable drape 30 and may be fused with a fusible tape. In this example process, the liquid organza and the RPET spacer may be fused at about 137° F. for a duration of about 20 seconds.

The above-described materials may then be fused to leather, a fabric, or other material, to form the composite material of removable drape 30 and, thereafter, the composite material undergoes a molding process to obtain the desired shape of removable drape 30, which is then draped into the base material 20 as described in embodiments herein. In some embodiments, a removable drape 30 comprises three layers. A middle layer may be thermoformed between two outer layers. After thermoforming the middle layer, the two outer layers may be thermoformed with the middle layer therebetween. The middle layer may be referred to as a "fusible" as the middle layer may be fused between the two outer layers. In some embodiments, the middle layer is a box toe material. In some embodiments, the outer layers are leather or acrylic. In some embodiments, the middle layer and/or the outer layers comprise any of the materials described herein.

Referring now to FIGS. 2A-C, an exemplary geometric cutting process for producing a draped configuration 46 in the base material 20 is illustrated. FIG. 2A depicts a first step 202 of creating a plurality of cut-outs 42 in base material 20. The cut-outs 42 may comprise a plurality of different shapes. For example, as shown in FIG. 2A, the cut-outs 42 may form a plurality of rectangular holes arranged in a substantially linear fashion. In some embodiments, at least one cut-out 42 may be made in a square shape. In some embodiments, at least one cut-out 42 may be made in a trapezoidal shape. In some embodiments, at least one cut-out 42 may be made in a circular shape. In some embodiments, at least one cut-out 42 may be made in an oval shape. In other embodiments, each cut-out 42 may be made in any desired shape. In some embodiments, each of a plurality of cut-outs 42 may be formed in a different shape. For example, a first cut-out 42 may be a rectangle, a second cut-out 42 may be a square, and a third cut-out 42 may be an oval.

Furthermore, the number of cut-outs 42 may vary. In some embodiments, the number of cut-outs 42 may range from one to ten. In another embodiment, the number of cut-outs 42 may be up to 100. The size of the cut-out 42 may also vary. In some embodiments, each cut-out 42 may have a size of about 2 inches by about 4 inches. In some embodiments, each cut-out 42 may range from an area of about 1 inch$^2$ to about 4 inches$^2$. Each of the cut-outs 42 may be made at a predetermined location on the base material 20. The predetermined locations of cut-outs 42 may be determined based on a desired draped configuration 46 described below. The predetermined locations of cut-outs 42 may also be based on the fit of the base material onto a user. In some embodiments, a corner or edge of the cut-out 42 is further cut. For example, when cut-out 42 is a rectangle, two opposite corners include an additional cut 43, as seen in FIG. 2A.

In a second step 204, the two un-snipped corners 45 are then pulled apart until the edges meet, creating two layers of base material 20 on top of one another. As seen in FIG. 2B, the two layers of base material 20 are then attached along an inner edge of the cut-out 42, such as by mechanical means. For example, the two layers of base material 20 may be attached together such as by sewing with a thread or by an adhesive to create a plurality of folds 44. The folds 44 may be formed along one or more axes. For example, the folds 44 may be formed along a horizontal axis. In some embodiments, the folds 44 may be formed along a vertical axis. In some embodiments, the folds 44 may be formed along an axial axis. In some embodiments, the folds 44 may be formed along one or more of the horizontal axis, the vertical axis, or the axial axis.

FIG. 2C depicts third step 206 of draping the base material 20 in a draped configuration 46. The draped configuration 46 may be formed by the combination of cut-outs 42 and folds 44 as described above.

The geometric cutting process for producing the draped configuration 46 in the base material 20 allows drapes to be created without the use of seams of darts. Furthermore, the removal of cut-outs 42 allows for maximum volume and structured, three-dimensional shape without having to use layers of gathered material. Thus, a shaped garment 10 can be created with minimum fabric and minimal unused scraps, and eliminates the need for making samples.

After the draped configuration 46 is formed in base material 20, a removable drape 30 may be attached thereto. The draped configuration 46 and the removable drape 30 may comprise complementary or corresponding shapes. By a complementary shape, it is meant that removable drape 30 may be draped or laid into the draped configuration 46 of base material 20 such that removable drape 30 does not need to be mechanically bonded thereto in order to stay in place. Thus, the correspondence of the shapes holds the removable drape 30 in place on the draped configuration 46 of the base material 20. To state another way, the removable drape 30 and the draped configuration 46 may have corresponding fits that hold the removable drape 30 and the draped configuration 46 in place without mechanical bonds. Due to the complementariness of shapes in the draped configuration 46 and the removable drape 30, the shaped garment 10 remains light-weight and the removable drape 30 remains in place and does not weigh down the base material 20. Referring now to FIG. 3A-B, an exemplary molding process for producing removable drape 30 is illustrated.

In a first step 302, a sheet 50 may be cut for molding into a three-dimensional structure. In some embodiments, sheet 50 has a thickness of about ⅛ to about ½ inch thick. In some embodiments, sheet 50 has a thickness of about ⅛ inch. In some embodiments, sheet 50 comprises an acrylic material. In some embodiments, sheet 50 comprises a two-sided mirrored acrylic material. Sheet 50 may be cut on a plurality of planes to generate a desirable shape. One skilled in the art will appreciate that any combination of desired cuts along different planes may be used to make a desired 3D shape from sheet 50. The shape in which to cut the sheet 50 may be configured using a computer program, such as Adobe® Illustrator®. These cuts may be made using one or more cutting methods, such as laser cutting techniques. In some embodiments, these cuts may be made using mechanical cutting methods, such as with scissors, shears, blades, etc. In some embodiments, cuts may be made by mechanically bending the sheet 50 until the sheet 50 breaks along the desired planes. Sheet 50 may comprise the material of removable drape 46.

Referring to FIG. 3A, in some embodiments, sheet 50 is initially provided flat and may be molded into a three-dimensional shape 54 to form removable drape 30. In some embodiments, sheet 50 may be provided in an initial curved configuration. The three-dimensional shape 54 may be formed into any combination of structures desired by a designer. Molding of the sheet 50 into the three-dimensional shape 54 may be performed by one or more commonly known molding methods, such as thermoforming. For example, sheet 50 may be heated to a sufficiently high temperature such that the material of sheet 50 exhibits a deformable or flexible configuration. In some embodiments, sheet 50 may be heated in an oven to a temperature of more than about 300° F. The temperature to which sheet 50 is heated may vary based on the material thereof. When heated, sheet 50 may be molded into a draped configuration. In some embodiments, sheet 50 may be molded by hand (with heat-protective gloves) or by mechanical tools. Upon sufficient cooling, the sheet 50 may have a three-dimensional shape 54 and may no longer be in the deformable configuration, thereby maintaining its three-dimensional shape. FIG. 3A depicts one example of a protrusion 56 and a trough 58 formed by three-dimensional shape 54. One skilled in the art will appreciate that any combination of protrusions 56 and troughs 58 may be formed from the sheet 50 in three-dimensional shape 54 of removable drape 30. In an embodiment, at least a portion of removable drape 30 is configured to match at least a portion of draped configuration 46 of the base material 20.

Referring now to FIG. 3B, in a step 304, the shaped garment 10 is configured, comprising the base material 20 in a draped configuration 46 and the removable drape 30 attached thereto. In an embodiment, the draped configuration 46 of the base material 20 is configured to receive a portion of the three-dimensional shape 54. In some embodiments, a portion of the three-dimensional shape 54 may seat directly into the folds 44 of draped configuration 46 such that the removable drape 30 will be anchored thereto by the correspondence of the shapes. The removable drape 30 does not require an additional bond in order to remain in place on the shaped garment 10. In some embodiments, a portion of the removable drape 30 may additionally be joined to the base material 20 via an adhesive. In some embodiments, a portion of removable drape 30 may be joined to base material 20 via mechanical bonding, such as snaps, buttons, hooks, hook-and-loop fasteners, or other fasteners. In some embodiments, removable drape 30 may be attached to a top surface of base material 20 such that removable drape 30 is not in direct contact with a user of shaped garment 10. In some embodiments, removable drape 30 may be attached to a bottom surface of base material 20 such that it is in direct contact with a user of shaped garment 10. In some embodiments, a removable drape 30 may be provided on both a top surface and a bottom surface of base material 20, in either an overlapping or non-overlapping configuration.

In an embodiment, the removable drape 30 may be removed from the base material 20. In some embodiments, after removal, removable drape 30 may be applied to another shaped garment 10. In some embodiments, a shaped garment 10 may be provided with a plurality of different removable drapes 30. In an example, the removable drape 30 may be removed from the base material 20 without damage to either piece. In one example, removable drape 30 may be removed from the draped configuration 46 of base material 20 by uncoupling of the physical binding, such as snaps or hook-and loop fasteners.

In some embodiments, the removable drape 30 may be remolded. If the removable drape 30 does not adequately fit draped configuration 46, the material of the removable drape 30 may be reheated and further molded to modify and reform the three-dimensional shape 54. Remolding may occur as many times as needed for said removable drape 30 to fit said draped configuration 46 or for said removable drape 30 to fit the desired three-dimensional shape 54 of the designer.

In some embodiments, the removable drape 30 may interchangeably fit a draped configuration 46 of one or more base materials 20. For example, the removable drape 30 may be removed from a first base material 20 in a draped configuration 46 and fitted to a second base material 20 in a draped configuration 46. In some embodiments, the draped configuration 46 of the first base material 20 and the draped configuration 46 of the second base material 20 may be similar. In some embodiments, the draped configuration 46 of the first base material 20 and the draped configuration 46 of the second base material 20 may be different.

In a second embodiment, as seen in FIG. 4, removable drape 30 may form an accent piece 60 on a surface of base material 20. In this embodiment, the draped configuration 46 of the base material 20, which may be designed using the geometric cutting process, is configured to receive a first portion 62 of the accent piece 60, which may be designed using the molding process. In some embodiments, the first portion 62 of the accent piece 60 may not be viewable from the exterior of the shaped garment 10, and may be provided on an inner surface thereof. In some embodiments, the first portion 62 of the accent piece 60 may be viewable from the exterior of the shaped garment 10 and be provided on an outer surface thereof. In some embodiments, a second portion 64 of the accent piece 60 may be configured to be viewable from the exterior of the shaped garment 10 and be provided on an outer surface thereof. In some embodiments, the first portion 62 may be integral with the second portion 64. In some embodiments, the first portion 62 may be separate from the second portion 64.

In some embodiments, the first portion 62 of the accent piece 60 may seat directly into the folds 44 of draped configuration 46 such that the accent piece 60 will be anchored thereto by the correspondence of the shapes. In this case, the accent piece 60 does not require an additional bond in order to remain in place on the shaped garment 10. In some embodiments, the first portion 62 and/or the second portion 64 may additionally be joined to the base material 20 via an adhesive. In some embodiments, the first portion 62 and/or the second portion 64 may be joined to base material 20 via connectors, such as snaps, buttons, hooks, hook-and-loop fasteners, or other fasteners. In some embodiments, accent piece 60 may be attached to a top surface of base material 20 such that it is not in direct contact with a user of shaped garment 10. In some embodiments, accent piece 60 may be attached to a bottom surface of base material 20 such that it is in direct contact with a user of shaped garment 10 when worn. In some embodiments, an accent piece 60 may be provided on both a top surface and a bottom surface of base material 20, in either an overlapping or non-overlapping configuration.

In an embodiment, there may be one or more accent pieces 60 fit to the base material 20. In one example, there may be between about one to about twenty accent pieces 60 fit to the base material 20. In one example, there may be between about one to about ten accent pieces 60 fit to the base material 20. In one example, there may be between about one to about five accent pieces 60 fit to the base material 20. In one example there may be one accent piece 60 fit to the base material 20.

In an embodiment, the accent piece 60 may be removable from the base material 20. In some embodiments, after removal, accent piece 60 may be applied to another shaped garment 10. In some embodiments, a shaped garment 10 may be provided with a plurality of different accent pieces 60. In an example, the accent piece 60 may be removed from the base material 20 without damage to either piece. In one example, accent piece 60 may be removed from the draped configuration 46 of base material 20 by uncoupling of the physical binding, such as snaps or hook-and-loop fasteners. In some embodiments, the plurality of different accent pieces 60 may comprise different patterns or colors and may be provided as a kit.

In a third embodiment, as seen in FIG. 5, removable drape 30 may form a strap 70 of shaped garment 10. As described above, removable drape 30 may be formed from materials such as leather, acrylics, thermoplastics, and the like. Multiple materials may be used and fused or otherwise coupled together prior to molding removable drape 30 into the desired shape. In this embodiment, the draped configuration 46 of the base material 20, which may be designed using the geometric cutting process, is configured to receive a first portion 72 of the strap 70, which may be designed using the molding process. In some embodiments, the first portion 72 of the strap 70 may not be viewable from the exterior of the shaped garment 10. In some embodiments, the first portion 72 of the strap 70 may be viewable from the exterior of the shaped garment 10. In some embodiments, a second portion 74 of the strap 70 may be configured to be viewable from the exterior of the shaped garment 10. In some embodiments, the first portion 72 may be integral with the second portion 74. In some embodiments, the first portion 72 may be separate from the second portion 74.

In some embodiments, one or more of the first portion 72 and the second portion 74 of the strap 70 may be configured to support the base material 20 on the body of the wearer. For example, the strap 70 may support the base material 20 by being configured to fit over the shoulder of the wearer. In one example, the strap 70 may support the base material 20 by being configured to fit around the chest of the wearer. In one example, the strap 70 may support the base material 20 by being configured to fit around the waist of the wearer. In some embodiments, the strap 70 may be required to support the base material 20 on the body of the wearer. In some embodiments, the strap 70 may not be required to support the base material 20 on the body of the wearer.

In some embodiments, the first portion 72 of the strap 70 may seat directly into the folds 44 of draped configuration 46 such that the strap 70 will be anchored thereto by the correspondence of the shapes. The strap 70 does not require an additional bond in order to remain in place on the shaped garment 10. In some embodiments, the first portion 72 of the strap 70 may additionally be joined to the base material 20 via an adhesive. In some embodiments, the first portion 72 of the strap 70 may be joined to base material 20 via mechanical bonding or coupling, such as snaps, buttons, hooks, hook-and-loop fasteners, or other fasteners. In some embodiments, strap 70 may be attached to a top surface of base material 20 such that it is not in direct contact with a user of shaped garment 10. In some embodiments, strap 70 may be attached to a bottom surface of base material 20 such that it is in direct contact with a user of shaped garment 10 when worn. In some embodiments, a strap 70 may be provided on both a top surface and a bottom surface of base material 20, in either an overlapping or non-overlapping configuration.

In an embodiment, there may be one or more straps 70 fit to the base material 20. In one example, there may be two straps 70 fit to the base material 20. In one example there may be one strap 70 fit to the base material 20.

In an embodiment, the strap 70 may be removable from the base material 20. In some embodiments, after removal, strap 70 may be applied to another shaped garment 10. In some embodiments, a shaped garment 10 may be provided with a plurality of different interchangeable straps 70. In an example, the strap 70 may be removed from the base material 20 without damage to either piece. In one example, strap 70 may be removed from the draped configuration 46 of base material 20 by uncoupling of the physical binding, such as snaps or hook-and loop fasteners. In some embodiments, the plurality of interchangeable straps 70 may comprise different patterns or colors and may be provided as a kit.

In a fourth embodiment, as seen in FIG. 6, removable drape 30 may form a pleated attachment 80. In this embodiment, the pleated attachment 80 is formed during the molding process, as depicted in FIG. 3A. In step 302, in one example, the pleated form may be molded into the removable drape 30 by pressing the removable drape 30 in a pleated mold while in the deformable configuration. In one example, the pleated form may be molded into the removable drape 30 by crimping the removable drape 30 in a pleated form while in the deformable configuration. In one example, the pleated form may be molded into the removable drape 30 by pinching the pleats into the removable drape 30 while in the deformable configuration.

In some embodiments, the draped configuration 46 of the base material 20, which may be designed using the geometric cutting process, is configured to receive a first portion 82 of the pleated attachment 80. In some embodiments, the first portion 82 of the pleated attachment 80 may not be viewable from the exterior of the shaped garment 10 and may be provided on an inner surface thereof. In some embodiments, the first portion 82 of the pleated attachment 80 may be viewable from the exterior of the shaped garment 10 and may be provided on an outer surface thereof. In some embodiments, a second portion 84 of the pleated attachment 80 may be configured to be viewable from the exterior of the shaped garment 10. In some embodiments, the first portion 82 may be integral with the second portion 84. In some embodiments, the first portion 82 may be separate from the second portion 84.

In some embodiments, one or more of the first portion 82 and the second portion 84 of the pleated attachment 80 may be configured to support the base material 20 on the body of the wearer. For example, the pleated attachment 80 may support the base material 20 by being configured to fit over the shoulder of the wearer. In one example, the pleated attachment 80 may support the base material 20 by being configured to fit around the chest of the wearer. In one example, the pleated attachment 80 may support the base material 20 by being configured to fit around the waist of the wearer. In some embodiments, the pleated attachment 80 may be required to support the base material 20 on the body of the wearer. In some embodiments, the pleated attachment 80 may not be required to support the base material 20 on the body of the wearer.

In some embodiments, the first portion 82 of the pleated attachment 80 may seat directly into the folds 44 of draped configuration 46 such that the pleated attachment 80 will be anchored thereto by the correspondence of the shapes. The pleated attachment 80 does not require an additional bond in order to remain in place on the shaped garment 10. In some embodiments, the first portion 82 of the pleated attachment 80 may additionally be joined to the base material 20 via an adhesive. In some embodiments, the first portion 82 of the pleated attachment 80 may be joined to base material 20 via mechanical bonding, such as snaps, buttons, hooks, hook-and-loop fasteners, or other fasteners. In some embodiments, pleated attachment 80 may be attached to a top surface of base material 20 such that it is not in direct contact with a user of shaped garment 10. In some embodiments, pleated attachment 80 may be attached to a bottom surface of base material 20 such that it is in direct contact with a user of shaped garment 10 when worn. In some embodiments, the pleated attachment 80 may be provided on both a top surface and a bottom surface of base material 20, in either an overlapping or non-overlapping configuration.

In an embodiment, there may be one or more pleated attachments 80 fit to the base material 20. In one example, there may be between about one to about twenty pleated attachments 80 fit to the base material 20. In one example, there may be between about one to about ten pleated attachments 80 fit to the base material 20. In one example, there may be between about one to about five pleated attachments 80 fit to the base material 20. In one example, there may be one pleated attachment 80 fit to the base material 20.

In an embodiment, the pleated attachment 80 may be removable from the base material 20. In some embodiments, after removal, pleated attachment 80 may be applied to another shaped garment 10. In some embodiments, a shaped garment 10 may be provided with a plurality of different interchangeable pleated attachments 80. In an example, the pleated attachment 80 may be removed from the base material 20 without damage to either piece. In one example, pleated attachment 80 may be removed from the draped configuration 46 of base material 20 by uncoupling of the physical binding, such as snaps or hook-and loop fasteners. In some embodiments, the plurality of interchangeable pleated attachments 80 may comprise different patterns or colors and may be provided as a kit.

In a fifth embodiment, as seen in FIG. 7A-B, removable drape 30 may include a screen-print portion 90. The screen-print portion 90 may include printed sections that block light, partially or completely, which may comprise one or more of shapes, letters, symbols, trademarks, or any other number of designs. In this embodiment, the screen-print portion 90 may be formed on the removable drape 30 in a step prior to step 302. In this step, the screen-print portion 90 may be formed by a plurality of techniques. For example, the screen-print portion 90 may be formed by ink-printing techniques. In one example, the screen-print portion 90 may be formed by one or more of drawing, etching, or stenciling ink onto the removable drape 30. In one example, the screen-print portion 90 may be formed by pressing ink into the removable drape 30. In one example, the screen-print portion 90 may be formed by pressing a marking into the removeable drape 30. In these examples, ink is used as an example, however any other screen-printed material may be used in its place.

In a sixth embodiment, as seen in FIG. 8, removable drape 30 may include an engraved portion 92. The engraved portion 92 may comprise one or more of shapes, letters, symbols, trademarks, or any other number of designs. In this embodiment, the engraved portion 92 may be formed in a step either before step 302, after step 302, or both before and after step 302. The engraved portion 92 may be formed by a plurality of techniques. For example, the engraved portion 92 may be manually cut into the removable drape 30 with one or more of scissors, blades, scalpels, lancets, or any other sharp tool. In one example, the engraved portion 92 may be formed using a preset cutter, such that a shape formed by the preset cutter may be removed from the removable drape 30. In one example, the engraved portion 92 may be removed from the removable drape 30 by laser cutting techniques.

In a seventh embodiment, as seen in FIG. 9, removable drape 30 may comprise an encased object 94. In this embodiment, the encased object 94 may be melded into the removable drape 30 either before step 302 or after step 302. In one example, the encased object 94 comes inserted in the removable drape 30. The encased object 94 may comprise any item reasonably insertable into the removable drape 30 as to not disturb the function or aesthetic purpose of the shaped garment 10.

It will be appreciated that any and all combinations of the aforementioned embodiments may be combined for the removable drape 30 of the shaped garment 10. For example, the strap 70 may comprise a pleated shape as shown in FIG. 6. In another example, the accent piece 60 may comprise a screen-print portion 90 as shown in FIG. 7A-B. In another example, the strap 70 may comprise an engraved portion 92. In another example, the accent piece 60 may comprise an encased object 94. Examples listed are not meant to be limiting and only serve as examples of possible combinations.

(A1) A fashion system including: a first material having a draped configuration formed by a geometric cutting process, wherein the draped configuration includes a first shape; and at least one removable drape formed by a molding process, wherein the at least one removable drape includes a second material, wherein the at least one removable drape includes a second shape, and wherein the first shape and the second shape are complementary and have a corresponding fit that holds the at least one removable drape in place on the draped configuration.

(A2) The fashion system denoted as (A1), wherein the geometric cutting process includes: forming a plurality of cut-outs in the first material, each of the plurality of cut-outs including a first edge and a second edge; and attaching the first edge to the second edge to form a fold, the fold forming a portion of the draped configuration.

(A3) The fashion system denoted as (A1) or (A2), wherein the geometric cutting process allows the draped configuration to be created without any seams or darts.

(A4) The fashion system denoted as any of (A1) through (A3), wherein the molding process includes: heating a flat sheet, the flat sheet including the second material; and molding the flat sheet into a three-dimensional shape, wherein the three-dimensional shape forms the at least one removable drape.

(A5) The fashion system denoted as any of (A1) through (A4), wherein the fashion system further includes a connector for coupling the at least one removable drape to the first material.

(A6) The fashion system denoted as any of (A1) through (A5), wherein the fashion system further includes at least one of: adhesives, snaps, hook-and-loop fasteners, or hooks for coupling the at least one removable drape to the first material.

(A7) The fashion system denoted as any of (A1) through (A6), wherein the at least one removable drape includes at least a first removable drape and a second removable drape, wherein the first removable drape has a different aesthetic feature than the second removable drape.

(A8) The fashion system denoted as any of (A1) through (A7), wherein the first material includes neoprene.

(A9) The fashion system denoted as any of (A1) through (A8), wherein the second material includes acrylic.

(B1) A process of manufacturing a shaped garment, including: providing a base material and a flat sheet of a drape material; forming a plurality of cut-outs in the base material, each cut-out of the plurality of cut-outs having a first edge and a second edge; attaching the first edge to the second edge to form a fold, wherein the fold forms a portion of a draped configuration; heating and forming the flat sheet into a three-dimensional shape, wherein the three-dimensional shape forms a removable drape; and attaching the removable drape to the draped configuration of the base material, wherein the removable drape and the draped configuration have complementary shapes that holds the removable drape on the base material.

(B2) The process denoted as (B2), wherein attaching the removable drape includes: attaching the removable drape to the draped configuration using at least one of an adhesive, snaps, hook-and-loop fasteners, or hooks.

(B3) The process denoted as (B1) or (B2), wherein attaching the first edge to the second edge includes sewing the first edge to the second edge.

(B4) The process denoted as any of (B1) through (B3), wherein the drape material includes acrylic, and wherein the base material includes neoprene.

(B5) The process denoted as any of (B1) through (B4), wherein the removable drape is thermoformed such that the removable drape is configured to be reheated and reformed into a new three-dimensional shape.

(C1) A fashion system formed by a method including: forming a plurality of cut-outs in a base material, each of the plurality of cut-outs having a first edge and a second edge; coupling the first edge to the second edge to form a fold, wherein the fold forms a portion of a draped configuration, wherein the draped configuration includes a first shape; forming a draping layer into a three-dimensional shape to form a removable drape, wherein the removable drape includes a second shape; and coupling the removable drape to the draped configuration, wherein the first shape and the second shape are complementary such that the draped configuration receives the removable drape and couples thereto without a mechanical bond.

(C2) The fashion system denoted as (C1), wherein the draping layer is thermoformed into the removable drape to form a strap for the fashion system.

(C3) The fashion system denoted as (C1) or (C2), wherein the method further includes: forming the removable drape from the three-dimensional shape into a new three-dimensional shape to form a new removable drape.

(C4) The fashion system denoted as any of (C1) through (C3), wherein the draping layer includes leather.

(C5) The fashion system denoted as any of (C1) through (C4), wherein the draping layer includes a first layer and a second layer, wherein the first layer includes a thermoplastic material and the second layer includes a leather, and wherein the second layer is draped over the first layer.

(C6) The fashion system denoted as any of (C1) through (C5), wherein the first layer is thermoformed into the three-dimensional shape.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments, what is claimed as new and desired to be protected by Letters Patent includes the following:

1. A method of forming a wearable fashion system, comprising:
   folding a portion of a first garment into a plurality of folds, the first garment comprising a fabric material;
   attaching, with at least one fastener, the plurality of folds together to form a three-dimensional folded shape;
   thermoforming a second garment into a three-dimensional molded shape that is complementary to the three-dimensional folded shape,
   wherein the second garment comprises:
      a first layer having a first material, and
      a second layer comprising a second material, the second layer laid over the first layer such that the second layer is viewable from an exterior of the wearable fashion system; and
   coupling, without fasteners, the second garment to the first garment by positioning the three-dimensional molded shape on the three-dimensional folded shape such that the second garment is removably held in place on the first garment.

2. The method of claim 1, wherein the three-dimensional molded shape comprises at least one pleat configured to be received within at least one of the plurality of folds.

3. The method of claim 1, wherein the first material comprises a synthetic resin or a heel counter.

4. The method of claim 1, wherein the at least one fastener removably attaches the plurality of folds together such that the first garment is re-foldable into a new plurality of folds to obtain a new three-dimensional folded shape.

5. The method of claim 1, wherein the second garment further comprises a third layer that is a middle layer between the first layer and the second layer.

6. The method of claim 5, further comprising:
   thermoforming the third layer to obtain a thermoformed middle layer; and
   thermoforming the first layer and the second layer with the thermoformed middle layer therebetween.

7. The method of claim 1, wherein the second garment is a strap garment.

8. A method of forming a wearable garment, comprising:
folding a portion of a first garment into a plurality of folds, the first garment comprising a fabric material;
attaching, with at least one fastener, the plurality of folds together to obtain a three-dimensional folded shape in the first garment;
thermoforming at least one of an inner layer or an outer layer of a second garment into a three-dimensional thermoformed shape; and
coupling, without fasteners, the second garment to the first garment by overlaying the three-dimensional thermoformed shape on the three-dimensional folded shape such that the three-dimensional thermoformed shape is at least partially received within the three-dimensional folded shape.

9. The method of claim 8, wherein the three-dimensional thermoformed shape is a first three-dimensional thermoformed shape and further comprising:
thermoforming a third garment into a second three-dimensional thermoformed shape; and
overlaying the second three-dimensional thermoformed shape over a second portion of the first garment such that the third garment is coupled to the first garment without fasteners.

10. The method of claim 8,
wherein the inner layer comprises an inner layer material distinct from an outer layer material of the outer layer, and
wherein the outer layer is not thermoformed, the inner layer is thermoformed into the three-dimensional thermoformed shape, and the outer layer is draped over the inner layer.

11. The method of claim 10, wherein the inner layer material comprises a thermoplastic and the outer layer material comprises a leather.

12. The method of claim 8, wherein the second garment comprises at least one of a fusible material, an acrylic, a leather, a synthetic resin, a liquid organza, or a recycled terephthalate (RPET).

13. The method of claim 8, wherein a first fold of the plurality of folds is attached to a second fold of the plurality of folds via the at least one fastener, the at least one fastener comprising one or more stitches.

14. The method of claim 8, wherein the three-dimensional folded shape and the three-dimensional thermoformed shape are complementary.

15. The method of claim 8, wherein the second garment further comprises a middle layer disposed between the inner layer and the outer layer and further comprising:
thermoforming the middle layer to obtain a thermoformed middle layer; and
wherein the thermoforming of at least one of the inner layer or the outer layer is performed with the thermoformed middle layer therebetween.

16. A wearable fashion system, comprising:
a first garment comprising a fabric material and having a plurality of folded portions coupled together by at least one fastener to form a three-dimensional folded shape in a portion of the first garment; and
a second garment comprising:
an inner layer comprising a first material;
an outer layer comprising a second material; and
a three-dimensional molded shape that is overlaid the three-dimensional folded shape and is complementary to the three-dimensional folded shape such that the first garment is coupled to the second garment when the three-dimensional molded shape is overlaid the three-dimensional molded shape, and
wherein at least one of the inner layer or the outer layer are thermoformed into the three-dimensional molded shape.

17. The wearable fashion system of claim 16, wherein the first garment and the second garment are coupled without fasteners.

18. The wearable fashion system of claim 16, wherein the second garment further comprises:
a middle layer comprising one of the first material or the second material.

19. The wearable fashion system of claim 18,
wherein both the first material and the second material are thermoformable,
wherein the middle layer is thermoformed before the outer layer and the inner layer, and
wherein the outer layer and the inner layer are thermoformed with the middle layer therebetween.

20. The wearable fashion system of claim 16, wherein at least a first portion of the three-dimensional molded shape sits within at least a second portion of the three-dimensional folded shape.

* * * * *